Figure 1:
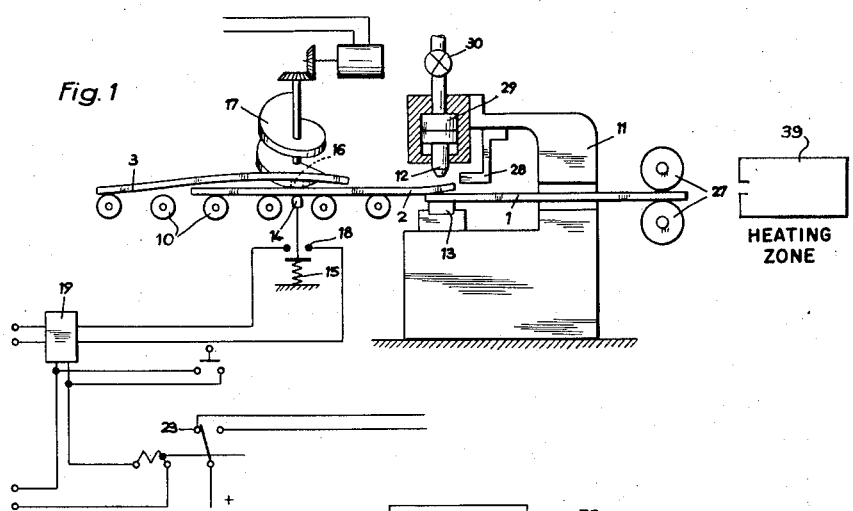

Nov. 10, 1959 W. H. SCHLIEKER ET AL 2,912,563
APPARATUS FOR WELDING AND CUTTING OF SHEET METAL
Filed Aug. 6, 1957 2 Sheets-Sheet 1

INVENTORS
WILLY H. SCHLIEKER
FRIEDRICH KUNZ
WILHELM PLETSCH
BY
ATTORNEYS

United States Patent Office 2,912,563
Patented Nov. 10, 1959

2,912,563
APPARATUS FOR WELDING AND CUTTING OF SHEET METAL

Willy H. Schlieker, Meerebusch, near Dusseldorf, Friedrich Kunz, Wuppertal-Elberfeld, and Wilhelm Pletsch, Velbert, Germany, assignors to Firm Walzwerk Neviges, Willy H. Schlieker & Co., Neviges, Rhineland, Germany Application August 6, 1957, Serial No. 676,558

5 Claims. (Cl. 219—78)

The invention relates to improvements in the production of sheet metal and is concerned particularly, but not exclusively, with the manufacture of sheet metal for use in electrical equipment.

It is known to subject sheet metal, which has been rolled in the form of sheets of the desired final thickness, to a continuous heat treatment and to connect the sheets together for this purpose. In a subsequent step in the process, the metal sheets which have been welded or otherwise connected together are separated again.

According to the invention, the interconnection of the metal sheets, and preferably the subsequent cutting apart thereof, is carried out in a continuous operation. For this purpose, the metal sheets, which have passed through the rolling step in the form of separate sheets are then welded together continuously and are continuously passed through a heat treatment zone, if desired after passing through a zone where they form an intermediate supply loop. By reason of the fact that the material passes through the heat treatment zone in strip form, the heat treatment takes place under a certain tension. According to a further feature of the invention, the tension may be increased above that which is necessary for satisfactory travel through the heat treatment zone in order to produce a tensional anisotropy in the material. Generally, this is effected by applying a stronger braking action to the material entering the heat treatment zone with correspondingly increased tension in the direction of feed. It is preferable to maintain this increased tension at least in one part of the cooling zone.

In the preferred method of carrying out the process, the sheet metal which has travelled in strip form through the heat treatment zone and usually also through a succeeding cooling zone, and if desired through other zones, for example through a magnetization zone, is thereafter divided again in continuous succession to form sheets. The division into sheets, may be effected by simultaneously cutting out in continuous succession the connecting strips of adjacent sheets. If it is desired to produce sheets of relatively small length, the sheets of the strip may additionally be divided at one or more intermediate points.

The invention is also concerned with apparatus for carrying out the process, which comprises, at the point at which the sheets are joined together to form a strip, a multiple spot welding device and, at the point of the subdivision of the strip, a cutting device. Both installations operate at a speed adapted to suit the speed of travel of the strip through the heat treatment zones.

The cutting device may be in the form of shears which, after the cutting operation, return sharply to their initial position, in combination with a holding-down device by which the strip material is gripped at the cutting point. Preferably, shears are provided which in each operation effect two closely adjacent cuts, the distance between which is adjustable. In addition, the distances from one double cut to the next may be adjustable in relation to the original length of the sheets which have been joined together. The shears may also be so designed that they carry out single cuts and double cuts in an adjustable sequence. It is also possible to operate with two shears mounted at a distance apart equal to the length of one sheet.

In the preferred embodiment, the welding is electrically controlled, either fully automatically or partly automatically. Preferably, the electrical control of the welding operation is effected by means of contacts operated by the rolled material in the manner known per se. A similar control may also be provided for the cutting device.

A multiple spot welding machine with displaceable welding electrodes has proved suitable for carrying out the welding. A single displacement corresponding to the extent of one half of the distance between the electrodes may be effected in each instance or alternatively more than one displacement may be effected, for example two displacements to the extent of one third of the distance between the welding electrodes may be effected. By means of such displacements, smaller intervals can be produced between the spot welds than would otherwise be obtainable by reason of the amount of space occupied by the individual electrodes and the consequently large intervals between the electrode centers which are necessitated thereby.

The invention enables the welding operation to be carried out at a speed corresponding to the continuous speed of the heat treatment process. However, it is advisable to provide an intermediate supply loop in the region of the welding installation in order to enable any unsatisfactory welding to be repeated when necessary.

For welding the sheets together, it is desirable to maintain a pre-determined width of overlap of succeeding sheet ends with great accuracy. This condition must be satisfied even when there are differences between the lengths of succeeding metal sheets. In such cases, a feeler member may be employed which reacts when the metal sheet reaches a particular point in its travel. During the passage of the metal sheets the feeler member actuates a braking device for the feed of the sheets, with a predetermined delay regulated by means of an adjustable time switch. A coupling switch actuated at a pre-determined time disengages a clutch in the drive of the sheet feed device and engages a clutch for the brake thereof. The clutch switch may for this purpose operate, for example, an electromagnetic change-over clutch. The sensing member may, for example, have the form of a terminal edge switch.

Time switches and coupling switches have hitherto generally been operated by means of alternating current. In a preferred embodiment of the present invention, both units are constituted by electronic control members. Electronic control members are known per se, but it has hitherto been assumed that, in the case of the control operations with which we are now concerned, the inaccuracies inherent in the mechanical and electromagnetic members would far exceed the inaccuracies of the alternating-current switches hitherto employed. Lengthy tests have shown, however, that considerably greater accuracy can be achieved in the feed of the sheets by using electronic control equipment. The accuracy of the overlapping of successive sheets during the welding operation depends upon the accuracy of the feed of the sheets.

In order to obtain still greater accuracy, it is proposed in addition to minimize, by the adoption of measures which are known per se, those inaccuracies which are present in the electromagnetic clutch itself and in the mechanical transmission elements.

In a further preferred embodiment, the feeler member itself is also designed as an electronic device.

Figure 2:
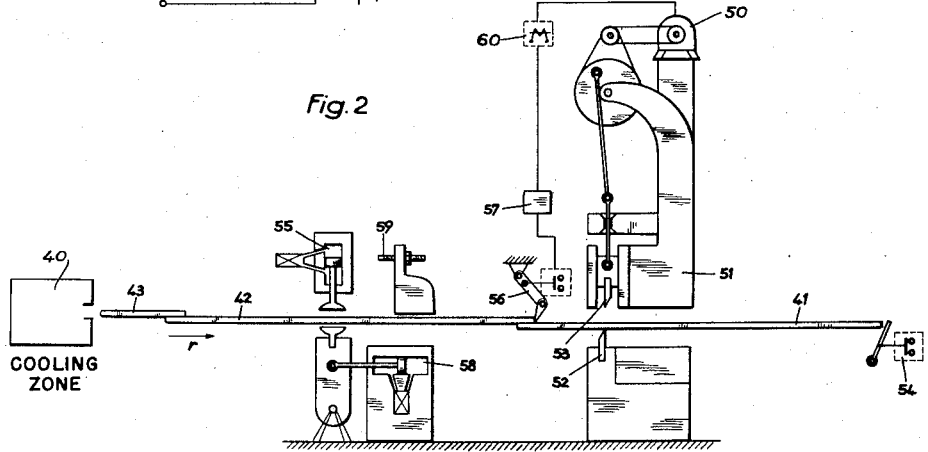
Figure 3:
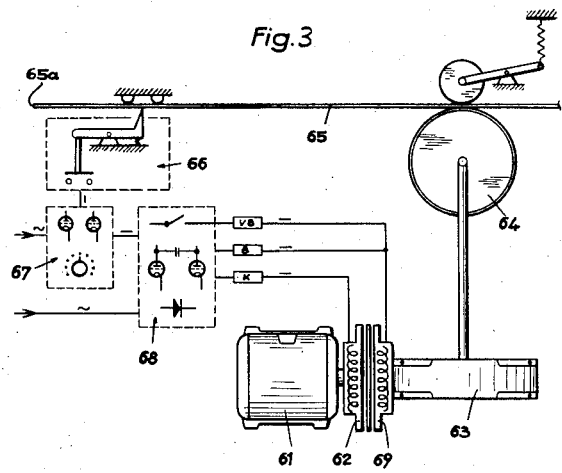
Figure 4:
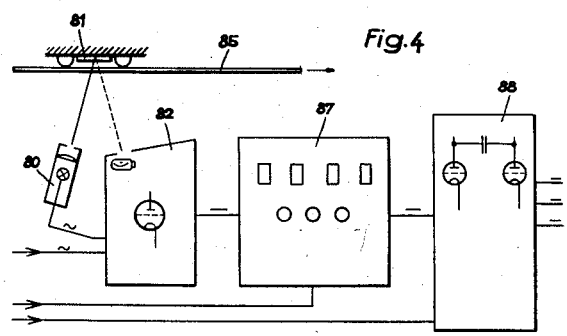

A number of preferred embodiments of the invention will hereinafter be described with reference to the accompanying diagrammatic drawings in which:

Figs. 1 and 2 are diagrammatic views, which when combined show an installation, Fig. 1 showing that the portion of the installation in the region of the welding device, and Fig. 2 that in the region of the cutting device; and Figs. 3 and 4 are diagrammatic views of two modified constructions for the control of the sheet feed in the vicinity of the welding point.

As shown in Fig. 1, the opposite ends of two succeeding sheets 1 and 2 are overlapped, for example, by 1.5 cm., and the sheets are welded together by spot welding of these overlapping ends. The process is such that the entire welding operation takes place so rapidly in each instance that the speed of travel of the resulting strip through the heat treatment zone can be maintained. For example, in the case of sheets approximately 2 m. in length, and where the material travels through the heat treatment zone at a speed of 12 metres per minute, six complete welds are carried out in a minute. Thus, the following steps must be completed in less than 10 seconds:

Drawing of the strip behind the welding machine to the position in which the end of the strip is under the welding electrodes.

Advancing the next sheet to produce the correct degree of overlap.

Welding, preferably multiple spot welding with displacement of the electrodes.

For this purpose, the following arrangements are provided:

A multiple spot welding machine 11 having a displaceable series of welding electrodes 12.

A step by step traction device 27, which draws the welded strip forward until the trailing end thereof takes up the correct position below the welding electrodes.

A control device 14, 15, 16 which is actuated in each instance by the passage of the following sheet and indicates when this sheet is ready for welding.

Fig. 1 shows diagrammatically a section through a constructional example of such an arrangement, and it is to be assumed that the series of electrodes 12 of the welding machine 11 contains twenty-four individual electrodes disposed at intervals over the width of the sheet. The electrodes are actuated by means of hydraulic pistons 29, to which hydraulic pressure is transmitted through valves 30 controlled in known manner. The electrodes are consequently lowered upon the overlapped sheets under hydraulic pressure and are also lifted hydraulically. A series of counter-electrodes 13, which is displaceable together with the series of electrodes 12 lies below the overlapped ends of the sheets 1 and 2. Preferably, the whole welding assembly is displaceable in the direction of the width of the sheet.

A feeler member 14 is provided in advance of the welding machine, in the path of the rolled sheets, the member 14 being part of a terminal edge switch comprising a spring 15 and a switching contact 18 and serving as a control device. In the interval of time illustrated in Fig. 1, the feeler member 14 which has a rounded upper end is held by the sheet 2 in a depressed position against the pressure of the spring 15, so that the contact 18 is open. The rounded end of the member 14 thus cannot yet snap into a hole 16 formed in the lowermost thread of a worm 17 to receive the feeler member. The following sheet 3 already lies in the worm 17, this sheet having been introduced over feed rollers 10 by feed devices not shown in the drawing.

The multiple spot welding machine 11 is preferably supplied through ignitrons by means of a number of galvanically separated welding transformer circuits. For example, four welding transformers are provided, each of which supplies six electrodes connected in series in pairs.

In the constructional example illustrated, it is assumed that 2×24—48 spots are welded with a single displacement of the series of electrodes, the welding of each set of 24 spots being sub-divided into three steps. During each of these steps, eight electrodes become effective simultaneously or preferably at brief intervals, as will hereinafter be more fully explained, one pair of electrodes of each of the four welding transformers becoming operative at a time.

An ignitron is provided in association with each of these welding transformers. The ignitrons are designed to operate at such times that they release the welding current only when the respective pair of electrodes has been lowered into its operative position, and that they block the current before this pair of electrodes is lifted. Then follow two further like welding steps, by means of which first the second and then the third pair of electrodes of the transformers become operative. The electrodes lowered into position under hydraulic pressure act at the same time to hold down the overlapped sheets.

If it is desired to keep the current impulse in the supply system low, it is possible, as already mentioned, to adjust the timing of the operation of the ignitron circuit arrangement so that the four pairs of electrodes for each individual welding step, of which one is associated with each of the four welding transformers, are successively rendered operative.

When eight electrodes have become operative in each of three intervals, that is to say, when all the twenty-four electrodes assumed to be provided in this constructional example have become operative, the electrodes 12 and 13 and the whole welding assembly are displaced to the extent of half the interval between the centers of adjacent electrodes and a further twenty-four spots are welded in a corresponding sequence of steps.

After completion of the welding, the step-by-step traction mechanism 27 which is disposed on the delivery side of the welding machine 11 and is preferably set in operation automatically, pulls the strip comprising sheets 1 and 2 through a further step. When the sheet 2 has been pulled through, the feeler member 14 snaps into the hole 16, whereby the contact 18 is closed. A relay 19 is thus caused to respond and actuates a switch 23 with a predetermined delay so as to disengage a clutch (not shown) in the drive of the step-by-step traction mechanism 27. The actuation of the switch 23 by the relay also causes a brake (also not shown) associated with the step-by-step traction mechanism to be applied, so that the trailing end of the sheet 2 takes up a position under the electrodes, in such manner that the rear terminal edge of the sheet 2 stops at a distance equal to half the overlapping width in front of the series of electrodes. Meanwhile, the sheet 3 has been made ready by rotation of the worm 17 at an appropriate instant, the forward edge of the said sheet having been brought up to a stripper abutment 28, which is staggered with respect to the series of electrodes 12 by an amount equal to half the overlap width in the direction of the feed. The welding arrangement 11 is thus again set in operation. When the spot welding operation has been completed, the traction device 27 on the delivery side of the welding machine again commences to operate and the cycle is repeated.

Depending upon the circumstances existing in each individual case, the desired procedure may be automatically controlled, or a number of steps may be initiated by hand. In any case, it is possible to change from the supply of individual sheets to a continuous travel of rolled material in strip form at a speed appropriate for the heat treatment.

It is expedient to provide a loop pit, i.e. a pit which will accommodate a suspended loop of the welded strip, on the delivery side of the step-by-step traction mechanism 27 by way of precaution, for example in case it should be necessary to repeat a welding. The loop pit serves, in general, to establish equilibrium between the step-by-step process before the welding machine and the continuous process in the heat treatment furnace 39. Naturally, the formation of a loop is practicable only with sheets of up to a particular thickness. Sheet metal having the usual thickness of 0.35–0.5 mm. generally has sufficient flexibility.

After leaving the loop pit, the material passes through a braking device the braking effect of which is adjustable and which co-operates with a continuous traction device disposed in the heat treatment zone 39 for the purpose of imparting an adjustable initial tension to the material during the passage thereof through the heat treatment zone. One object of this initial tension is to reduce the sag of the strip between adjacent supporting rollers, but a more important object is to create a tensile stress in the rolled material so as to produce a mechanical tensional anisotropy in the material for the purpose of increasing its susceptibility to magnetization in one direction. The magnitude of the tension depends upon the magnitude of the desired tensional anisotropy. For example, a tension of the order of 1–10 kg./mm² of the cross-section of the sheet metal has been found to be a suitable value.

Generally speaking, the strip travels, during the continuous treatment, through a heat treatment zone 39 (Fig. 1) and a cooling zone 40 (Fig. 2) or if desired through a number of such zones as well as through other treatment zones, including for example one containing a magnetic field. After cooling, the strip is subdivided into individual sheets, this operation being suitably carried out to match the speed of passage of the strip during the preceding manufacturing operation. For this purpose, the strip is fed to a cutting unit, preferably comprising shears, after leaving the continuous traction device. The shears perform the function of sub-dividing the strip into sheets and, if desired, of cutting out the overlapped strips at the junction between each pair of sheets. The operation of the shears may be regulated by means of switching members which may be adjusted, for example, either to produce sheets of constant length or to cut out an overlapped strip of constant width.

In the constructional example illustrated diagrammatically in Fig. 2, the cutting device 51 consists of a conventional sheet metal cutting shears having a fixed blade 52 and a movable blade 53 operated by a motor 50. The heat-treated material after leaving the cooling zone 40 arrives at the cutting device in the form of a strip comprised of sheets 41, 42, 43 welded together. The feeding direction is indicated by the arrow r.

The cutting device will hereinafter be described in conjunction with two different methods of operation, i.e. firstly in the case where the strip is cut into sheets of a predetermined length, and secondly the case where the overlapping portions of the strip are cut out in each instance without maintaining very accurate sheet lengths. In the ideal case, i.e. when sheets of exactly equal length always arrive at the welding device and are welded together therein with an exactly uniform overlap, the two methods of operation are equivalent.

When the cutting device has been adjusted for cutting out exactly equal sheet lengths from the joined annealed material, an impact switch effects, in each instance, the tripping of a clutch (not shown) for the shears, after the sheet metal has been clamped by a holding-down device 55, which is also tripped automatically by an impact switch 54. The holding-down device is then automatically lifted again.

When the first step has thus been completed, the overlapped portion of the welded strip is separated by a second cutting step. This operation is initiated by a switch 56, which is actuated by the overlapping portion of the strip as shown, and initiates the respective movement of the shears through a time relay 57 connected into the switch 56 and into a motor controller 60, which in turn is connected to the motor 50. The time relay is set to the time which is necessary to move the sheet from the switch 56 into the correct position in relation to the blades 52, 53. The operation of the holding-down device 55 is so controlled in relation to the switching sequence for the cutting device 51 that it is also actuated for clamping the sheet metal for the second cutting step, when the strip has reached the correct position in relation to the blades 52, 53, and that the cutting operation is initiated only after actuation of the holding-down device.

If only the overlapping portion is to be cut out in each instance independently of the lengths of the resulting sheets, i.e, only a minimum width between two sheets welded together, the impact switch 56 can so initiate the operation of the shears through the time relay 57 that the shears 52, 53 cut before the passage of the overlap or weld between the sheets 41 or 42. The cutting operation is preceded by clamping by means of the holding-down device 55. While in the process first described the holding-down device 55 releases the material in the interval between the first and second cuts, in the present case the holding-down device is shifted forwards in the feed direction as far as a stop 59 by means of a correspondingly controlled drive 58 with the shears open, the clamping action being maintained, and initiates the second cut of the shears after impact against said stop 59, this second cut then being made behind the overlap or weld.

After the second cut, the cutting device 51 and the holding-down device 55 open, so that a further sheet length can pass, until the impact switch 56 repeats the desired cutting procedure for the next cutting position to cut out the weld to a minimum width at that position.

The width of the cut-out weld strips may be varied by adjustment of the stop 59. Also, the sheet length may be varied by appropriate adjustment of the stop impact switch 54 for the first-mentioned method of operation.

The arrangement may also be so designed that the strip can not only be cut out at the welded positions, but may also be further subdivided. For this purpose, for example, there is arranged behind the shears a further impact switch which controls the holding-down device and the shears accordingly. For example, the holding-down device and the shears are so actuated and the electric control is so adjusted that alternately a dividing cut is made as an individual cut and then a double cut is made for effecting the division at the welded position and cutting out the weld.

The different cutting intervals which must be maintained in the processes described above are preferably adjustable.

Control systems improved for the purpose of increasing the accuracy of the feed of the metal sheet to the welding point (Fig. 1) will now be described with reference to Figs. 3 and 4.

In the constructional example according to Fig. 3, a motor 61 drives, through a clutch 62 and gearing 63 a feed roller 64 for the rolled sheet material 65. A terminal edge switch 66 serving as a feeler member and co-operating with the terminal edge 65a of the sheet material need not be described in detail. When operated, it closes the circuit of an adjustable delay time switch 67, which in turn operates a switch 68 controlling an electromagnetic change-over clutch, which alternately actuates in known manner the clutch 62, for the drive of the metal sheet feed mechanism and a clutch for a brake 69 thereof. The clutch switch 68 actuates both the clutch magnet for starting and stopping the driving movement and the clutch magnet for engaging and disengaging the brake. The starting of the motor drive need not in the present case take place with extreme accuracy. Therefore, in the present constructional example, no regard has been had to the accuracy of this switching operation. In the case of the clutch switch, the initiation of the pre-energization VB for the brake has been combined with the actual control of the braking action B.

The accuracy of the process, in so far as the clutch magnet has an influence thereon, is dependent upon these two last-mentioned switching arrangements and upon the time switch 67. Electronically controlled devices may be used both as the time switch 67 and as the clutch switch 68. The time switch operates with thyratron valves filled with rare gas, and the clutch switch with mercury vapour thyratron valves.

The advantages of the system shown in Fig. 3 may be explained with reference to a practical example.

In an installation for step-by-step feed with the usual arrangements for the terminal edge switch, time switch and coupling switch, and with a speed of the sheet metal feed of 0.8 m./sec. the extent of variation in the positions in which the terminal edge of the sheet was stopped amounted to ±17 mm. This extent of variation was reduced to about ±8 mm. by the application of improvements known per se for the mechanical transmission elements and for the electromagnetic clutch. Of this, the purely mechanical and coupling parts accounted for only ±1.15 mm. By employing the electronic switching members as described, it was surprisingly possible to reduce the total extent of variation to ±1.50 mm.

In a further embodiment illustrated in Fig. 4, the terminal edge switch itself has the form of an electronic device. Instead of the usual mechanical feeler member for cooperating with the terminal edge of the sheet, there is employed a light beam which is emitted by a light source 80 and is reflected by a mirror 81 onto a photoelectric cell 82 as soon as the metal sheet 85 exposes the mirror by the passage of its terminal edge. The energized photoelectric cell 82 operates a clutch switch 88 for the actuation of the brake, by means of a time switch 87. The time switch operates with a high-frequency supply and with counting tubes. By the use of an electronic terminal edge switch, the extent of variation in the positions of the terminal edge is further reduced. In the case of the example just described, it was found possible further to reduce the extent of variation by one half.

A particularly important feature of the improved control is that the reduction in the extent of variation is effected independently of the sheet length, that is to say, to an equal extent for sheets of different lengths, regardless of the difference in the lengths of the successive sheets.

The improved control has been described by way of example as applied to the control of the feeding of a rolled sheet by means of terminal edge switches. The circuit arrangement may with advantage be employed also for other controls in which accurate step-by-step feeding is required. In addition, the invention may be employed with advantage in other cases in which it is desired to improve the accuracy of movements which are carried out step-by-step.

What we claim is:

1. In an apparatus for the production of sheet metal including heat treating and cooling units in series for treating sheet metal in strip form, a multiple spot welder for welding metal sheets end-to-end in overlapping series arrangement to form a strip, the operation of the welder being adapted to correspond to the speed of passage of the sheets in strip form through the heat treating unit, a cutting device for receiving the treated strip from the cooling unit, said cutting device including a holding-down device and shears, means including control members for automatically correlating the operations of the holding-down device and of the shears in each instance, electric switches actuated by the movement of the strip to be cut into sheets for actuating the control members, means for displacing the holding-down device in the direction of movement of the strip, whereby the shears are adapted to make two cuts close to one another at intervals determined by the extent of displacement of the holding-down device, and means for adjusting the extent of displacement of the holding-down device.

2. In an apparatus for the production of metal sheets including means for welding together the adjacent overlapping ends of a series of metal sheets to form a strip for treatment in a heat treating zone, and a cutting device to which the strip formed by the welded series of metal sheets is continuously fed after leaving the treating zone, a holding-down device associated with the cutting device, electric switch means controlling the operation of the cutting device in dependency on the movement of the strip thereto, the electric switch means including terminal edge switches including a switch responsive to the overlapping portions of the strip at the joints of the strip welded together in overlapping relation, said switches of the electric switch means controlling the cooperation between the holding-down device and the cutting device so that a plurality of welded joints are cut out from the strip and a plurality of sheets are separated from the strip within a period of one minute.

3. An apparatus as claimed in claim 2, characterized by including a device for displacing the holding-down device in the direction of movement of the strip, the cutting device being adapted to make two cuts close to one another for cutting out a welded joint, and in which the interval between the two cuts is determined by the extent of displacement of the holding-down device, and means for adjustably varying the extent of displacement of the holding-down device.

4. In an apparatus for the production of metal sheets, a welder for welding together the adjacent overlapping ends of a series of metal sheets to form a strip for treatment in a treating zone, means for intermittently feeding the strip of welded-together sheets through the welder as the strip is formed, including means for positioning the strip so that its trailing edge is in position to be welded, and means for advancing a sheet of material into the welder so that its leading edge is in position to be welded to the trailing edge of said strip, said strip feeding means including interrupting means operatively connected to interrupt the advancing of said strip so that said strip will be advanced through the welder only when said interrupting means is not actuated, sensing means actuated in response to the trailing edge of the strip passing a predetermined position with respect to said sensing means in the direction of movement of said strip, a time delay switch operatively connected to said sensing means, a switch actuated by said time delay switch to actuate said interrupting means and thereby stop the movement of the strip, the time delay being sufficient to permit said trailing edge to move into position to be welded, whereby said strip will be advanced into position to be welded and stop upon reaching said position.

5. An apparatus for the production of metal sheets as set forth in claim 4, characterized in that the welder comprises a multiple spot welder for welding together the overlapping ends of adjacent metal sheets over the entire width of the strip, said multiple spot welder including a plurality of welding electrodes which are displaceable together in a direction transverse to the direction of feed of the metal sheets.

References Cited in the file of this patent

UNITED STATES PATENTS

| Number | Name | Date |
|---|---|---|
| 1,693,800 | Tytus | Dec. 4, 1928 |
| 1,811,522 | Shover et al. | June 23, 1931 |
| 2,057,794 | Sorensen et al. | Oct. 20, 1936 |
| 2,247,766 | Boerger | July 1, 1941 |
| 2,351,922 | Burgwin | June 20, 1944 |
| 2,369,830 | Johnson et al. | Feb. 20, 1945 |
| 2,394,466 | Muddiman | Feb. 5, 1946 |